United States Patent
Uczekaj et al.

(10) Patent No.: US 9,800,665 B2
(45) Date of Patent: *Oct. 24, 2017

(54) AVIONICS GATEWAY INTERFACE, SYSTEMS AND METHODS

(71) Applicant: Aspen Avionics, Inc., Albuquerque, NM (US)

(72) Inventors: John Uczekaj, Albuquerque, NM (US); Brad Hayden, Albuquerque, NM (US); Peter Lyons, Albuquerque, NM (US); Constantinos Kyriakos, Indian Harbour Beach, FL (US); Joseph Lyle, Albuquerque, NM (US)

(73) Assignee: Aspen Avionics, Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,505

(22) Filed: Nov. 16, 2015

(65) Prior Publication Data

US 2016/0219110 A1 Jul. 28, 2016

Related U.S. Application Data

(63) Continuation of application No. 14/458,680, filed on Aug. 13, 2014, now Pat. No. 9,189,655, which is a (Continued)

(51) Int. Cl.
*G06F 21/00* (2013.01)
*H04L 29/08* (2006.01)
(Continued)

(52) U.S. Cl.
CPC ............ *H04L 67/12* (2013.01); *G06F 21/602* (2013.01); *G06F 21/71* (2013.01);
(Continued)

(58) Field of Classification Search
CPC ........ G06F 21/10; G06F 21/105; G06F 21/44; G06F 21/57; G06F 21/70
See application file for complete search history.

(56) References Cited

U.S. PATENT DOCUMENTS 5,875,296 A † 2/1999 Shi
6,401,013 B1 * 6/2002 McElreath ........... G01C 23/005
244/1 R
(Continued)

FOREIGN PATENT DOCUMENTS

CN 101836422 A 9/2010

OTHER PUBLICATIONS

Peter Skaves, EFB Wireless Connectivity & Security Considerations, pp. 1-14, published Sep. 22, 2010, publisher Aircraft Electronics Association, place of publication http://www.aea.net/wifisummit/pdf/Network%20Security.pdf.†

*Primary Examiner* — Edward Zee

(57) ABSTRACT

Systems and methods are provided for FAA-certified avionics devices to safely interface with non-certified mobile telecommunications devices before, during, and after flight. Data transmitted to the certified devices do not affect functionality of the certified device unless and until a user acknowledges and/or confirms the data on the certified device. Thus, the integrity of the certified device is maintained.

13 Claims, 15 Drawing Sheets

Related U.S. Application Data continuation of application No. 14/119,966, filed as application No. PCT/US2012/047874 on Jul. 23, 2013, now Pat. No. 9,141,830.

(60) Provisional application No. 61/510,800, filed on Jul. 22, 2011, provisional application No. 61/674,340, filed on Jul. 21, 2012.

(51) Int. Cl.
*G06F 21/60* (2013.01)
*G06F 21/71* (2013.01)
*H04B 7/185* (2006.01)
*H04L 29/06* (2006.01)

(52) U.S. Cl.
CPC ......... *H04B 7/18506* (2013.01); *H04L 63/02* (2013.01); *H04L 63/0884* (2013.01); *H04L 63/10* (2013.01)

(56) References Cited

U.S. PATENT DOCUMENTS

| | | |
|---|---|---|
| 8,397,286 B2 | 3/2013 | Declety et al. |
| 8,732,233 B2 † | 5/2014 | Allen |
| 2003/0038844 A1* | 2/2003 | Royalty .................... G06F 3/14 715/781 |
| 2005/0228549 A1* | 10/2005 | Stickling ................ H04B 15/00 701/3 |
| 2006/0282597 A1 † | 12/2006 | Plogmann |
| 2008/0195309 A1* | 8/2008 | Prinzel, III ............ G01C 23/00 701/532 |

\* cited by examiner
† cited by third party

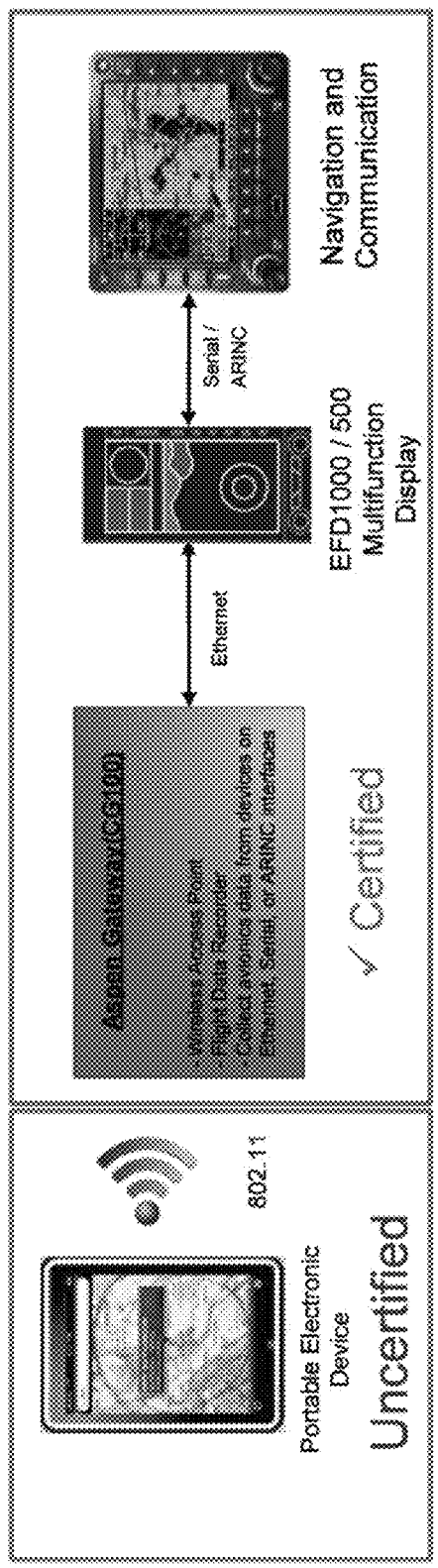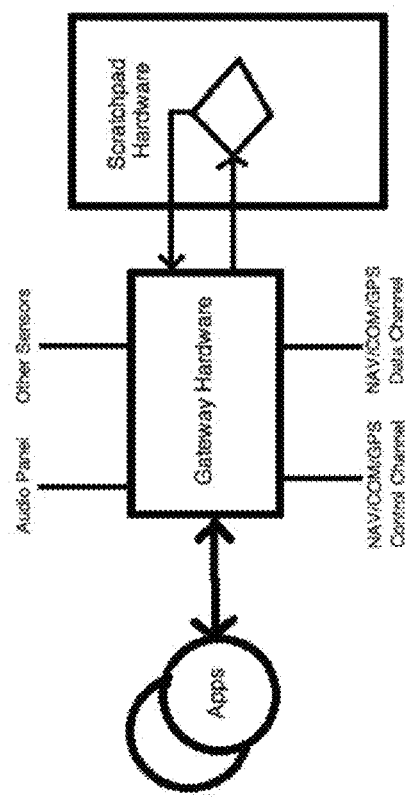
Figure 15

AVIONICS GATEWAY INTERFACE, SYSTEMS AND METHODS

CROSS-REFERENCES

This application is a continuation of U.S. Non-Provisional application Ser. No. 14/458,680 filed Aug. 13, 2014, which is a continuation of U.S. Non-Provisional application Ser. No. 14/119,966 filed Nov. 25, 2013, which is a United States National Stage of Patent Cooperation Treaty Application No. PCT/US2012/047874 filed Jul. 23, 2012, which claims priority to U.S. Provisional Patent Application Ser. No. 61/510,800, filed Jul. 22, 2011, and to U.S. Provisional Patent Application Ser. No. 61/674,340, filed Jul. 21, 2012, the disclosures of which are incorporated herein by reference in their entireties.

BACKGROUND

Field

The present general inventive concept relates to gateway interface systems and methods for avionics devices. More particularly the inventive concept relates to methods and systems to interface communications between FAA-certified and non-certified devices, systems, and equipment.

The United States Federal Aviation Administration ("FAA") establishes, via regulations, certain minimum standards and requirements that must be satisfied by avionics devices, systems and equipment, particularly when the avionics device is essential or critical to flight safety. For example, FAR 23.1311(b) is a regulatory requirement that requires, among other things, redundant backup instruments in the cockpit. As used throughout this specification, an "FAA-certified device" may include any and all avionics devices, systems, and equipment that comply with FAA regulations and are approved for in-flight use. Approval may be secured via a Technical Standard Order (TSO), Type Certificate (TC), Supplemental Type Certificate (STC), or other similar processes and procedures. Examples of FAA-certified devices include (but are not limited to) Multi-function Flight Displays ("MFD") such as the Evolution Flight Display ("EFD") available from ASPEN AVIONICS, the KSN 770 available from HONEYWELL BENDIX/KING, and the GNS 430/530 available from GARMIN.

Third-party software developers have developed, and are expected to continually develop newer, software applications (also known as "apps") for non-certified devices to enhance the flight experience. Applications that can be used by pilots to add convenience and efficiency have been developed for various mobile operating systems such as APPLE iOS, ANDROID, BLACKBERRY, and others. As used throughout this specification, a "non-certified device" may include any mobile electronics communications device. Examples of non-certified devices include (but are not limited to) cell phones, smart phones, BLACKBERRY mobile communications devices, IPADs, IPODs, IPHONEs, laptops, tablet PCs, and similar mobile computing platforms. Indeed, non-certified mobile devices and many software applications have become quite popular and commonly available in recent times.

The FAA strictly regulates interconnectivity of flight systems to ensure certain minimum standards of flight safety. Unfortunately, because the vast majority of popular mobile communications devices are non-certified devices, the devices and their convenient software applications are unavailable for direct interfacing with FAA-certified devices without compromising the integrity, reliability, and certification of the FAA-certified devices.

Mobile devices have revolutionized how pilots obtain and use data. Since there is no data link between these mobile devices and the installed avionics, their use in the cockpit has been limited by a lack of integration with onboard systems. The EVOLUTION FLIGHT DISPLAY ("EFD") products available from ASPEN AVIONICS or other similar devices such as Multi-function Displays (MFD) and Primary Flight Displays (PFD) are interoperable with a large variety of new and legacy avionics products from multiple manufacturers, making them a natural gateway to certified flight data. Currently, there is demand for a non-certified, mobile computing device to wirelessly interface directly with FAA-certified devices during flight, but such a device is not available in the market. What is needed is a wireless bridge between handheld devices and the aircraft's certified avionics to increase the pilot's access to data and the utility of the mobile devices.

SUMMARY

The present general inventive concept provides a platform (gateway or interface) to enable two-way communications between non-certified devices and FAA-certified devices. One object of the general inventive concept is to seamlessly integrate non-certified devices with FAA-certified avionics devices without interfering with the functionality or otherwise compromising the integrity of the FAA-certified devices and systems. Another object of the general inventive concept is to provide wireless connectivity (e.g., a mobile hotspot) for non-certified devices within the cockpit. Another object of the general inventive concept is to provide an electronics communication interface system that is sufficiently robust as to be highly customizable by end-users, and also largely compatible with numerous FAA-certified and non-certified devices and systems, whether currently-in-use or yet-to-be-developed.

In preferred embodiments, the gateway interfaces with FAA-certified devices without interfering with any functionality of the FAA-certified devices. Preferred embodiments of hardware interfaces include pre-determined specifications and software interfaces include a set of Application Programming Interface ("API") rules and specifications that guide interaction with the gateway, on both the non-certified end as well as the FAA-certified end. To simplify the hardware and software interfaces design, standardized protocols and rules are adhered to whenever possible. The use of application specific standards or formats is avoided as much as possible.

In a preferred embodiment, the gateway enables communication between the FAA-certified devices and non-certified devices with both a hardware component and a software component. If instructions are sent to the FAA-certified device via the gateway that may impact any functionality of the FAA-certified device, the instruction does not take effect on the FAA-certified device unless and until a user acknowledges and confirms the instructions via an FAA-certified device. The confirmation of the instructions ensures that the user-acknowledged data or instructions are validated to be received accurately by the using FAA-certified device and the user informed of the status of the validation. In this manner, no activities of the non-certified device or the gateway can interfere with the functionality of the FAA-certified device absent a confirmation or acknowledgment from the FAA-certified device. In some embodiments, the gateway, as a hardware component, is certified by the FAA as non-interfering with critical systems. The software code associated with the gateway, requiring the acknowledgement/confirmation, is likewise certified by the FAA as non-interfering with critical systems.

In a preferred embodiment, the hardware is enclosed in a small box that is blind-mounted in the aircraft as a separate, stand-alone component from the non-certified devices and FAA-certified devices that it integrates together. The feature-rich hardware component contains wireless, Bluetooth and USB connectivity options as well as flash memory storage. It also includes commercially available technology such as standard protocol ports and communications slots that will allow other third party companies to interface peripheral hardware as needed to enhance the utility of their own applications. It will be appreciated that in other embodiments the gateway of the instant invention will be a hardware and/or a software component that is integrated into a FAA-certified device, such as the EFD available from ASPEN AVIONICS.

Applications on non-certified devices allow users to interface with an aircraft's FAA-certified devices via the gateway. Some of these apps allow a user to upload and/or or modify flight planning data on his or her non-certified device and then synchronize this data with the aircraft's navigation and other FAA-certified devices via the gateway. Some of these apps allow a user to manage the aircraft logbook, maintenance records, and/or operational statistics on his or her non-certified device via the gateway.

In preferred embodiments, the gateway provides wireless telecommunications connectivity for non-certified devices. For example, the wireless connectivity is provided via a WiFi network (e.g., 802.11a/b/g/n), 3G/4G mobile telecommunications network, iridium satellite telecommunications network, BLUETOOTH, or similar. In some embodiments, the gateway provides wired connectivity to non-certified devices. For example, the wired connectivity is provided via USB, Ethernet, or similar.

The foregoing and other objects are intended to be illustrative of the general inventive concept and are not meant in a limiting sense. Many possible embodiments of the invention may be made and will be readily evident upon a study of this specification and accompanying drawings comprising a part thereof. Various features and subcombinations may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

These and/or other aspects and utilities of the present general inventive concept will become apparent and more readily appreciated from the following description of the embodiments, taken in conjunction with the accompanying drawings. For the purpose of illustration, forms of the present general inventive concept which are presently preferred are shown in the drawings; it being understood, however, that the general inventive concept is not limited to the precise arrangements and instrumentalities shown. In the drawings:

FIG. 15 shows an exemplary embodiment of a system of the present general inventive concept.

DETAILED DESCRIPTION

This general inventive concept provides an electronic gateway interface module designed to provide telecommunications connectivity between cockpit avionics and mobile devices (i.e., between FAA-certified and non-certified devices). One example of the general inventive concept is described, in detail, in co-pending U.S. Provisional Patent Application Ser. No. 61/674,340, filed Jul. 21, 2012, the entire disclosure of which is incorporated herein by reference.

Figure 1:
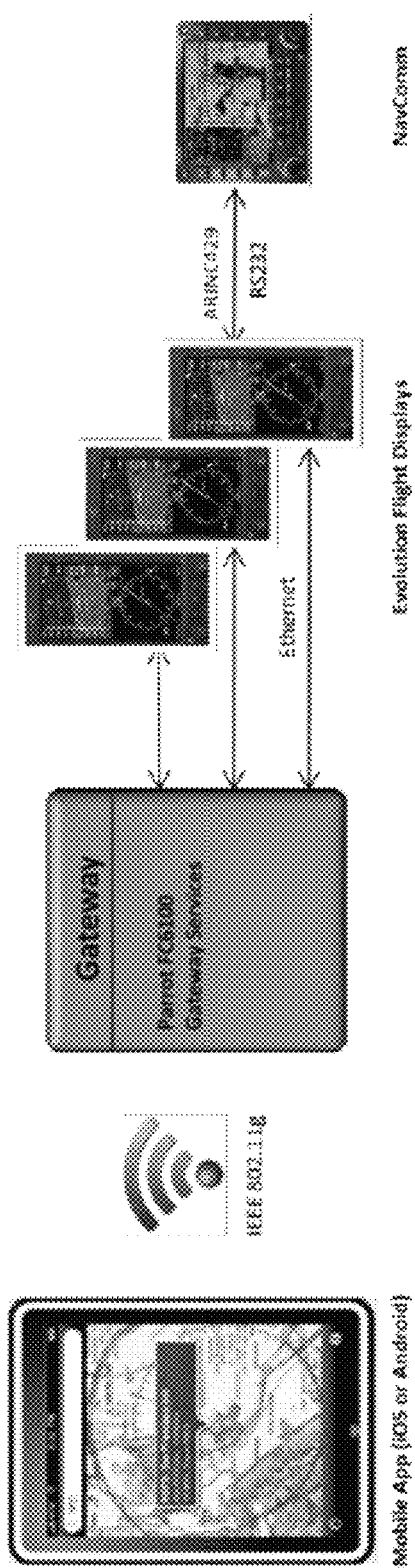
FIG. 1 is an exemplary embodiment of the general inventive concept where a mobile application is operated on a non-certified device in wireless communication with a gateway which is then in hardwire communication with FAA-certified devices such as multi-function flight displays (via Ethernet) and/or navigation equipment (via ARINC429 or RS232).

Referring to FIG. 1, the gateway provides a hardwire telecommunications link to FAA-certified devices, such as ASPEN'S EFD, via an Ethernet interface, or such as a navigation system, via an ARINC429 (RS-232) connection. The gateway also provides a telecommunications link to non-certified devices, such as mobile phones, tablets, electronic notebooks, laptops, or similar. In FIG. 1, the gateway provides a wireless link to non-certified devices via WiFi (IEEE 802.11a/b/g/n). The gateway acts as a wireless access point providing a connection point between wireless mobile devices and avionics equipment. In some embodiments the gateway utilizes standard security protocols and/or security certification programs developed to secure wireless computer networks, such as WPA, WPA2, WEP, etc. The gateway may be a standalone device or part of FAA-certified device including software used in that FAA-certified device to provide gateway functionality as defined herein.

Figure 2:
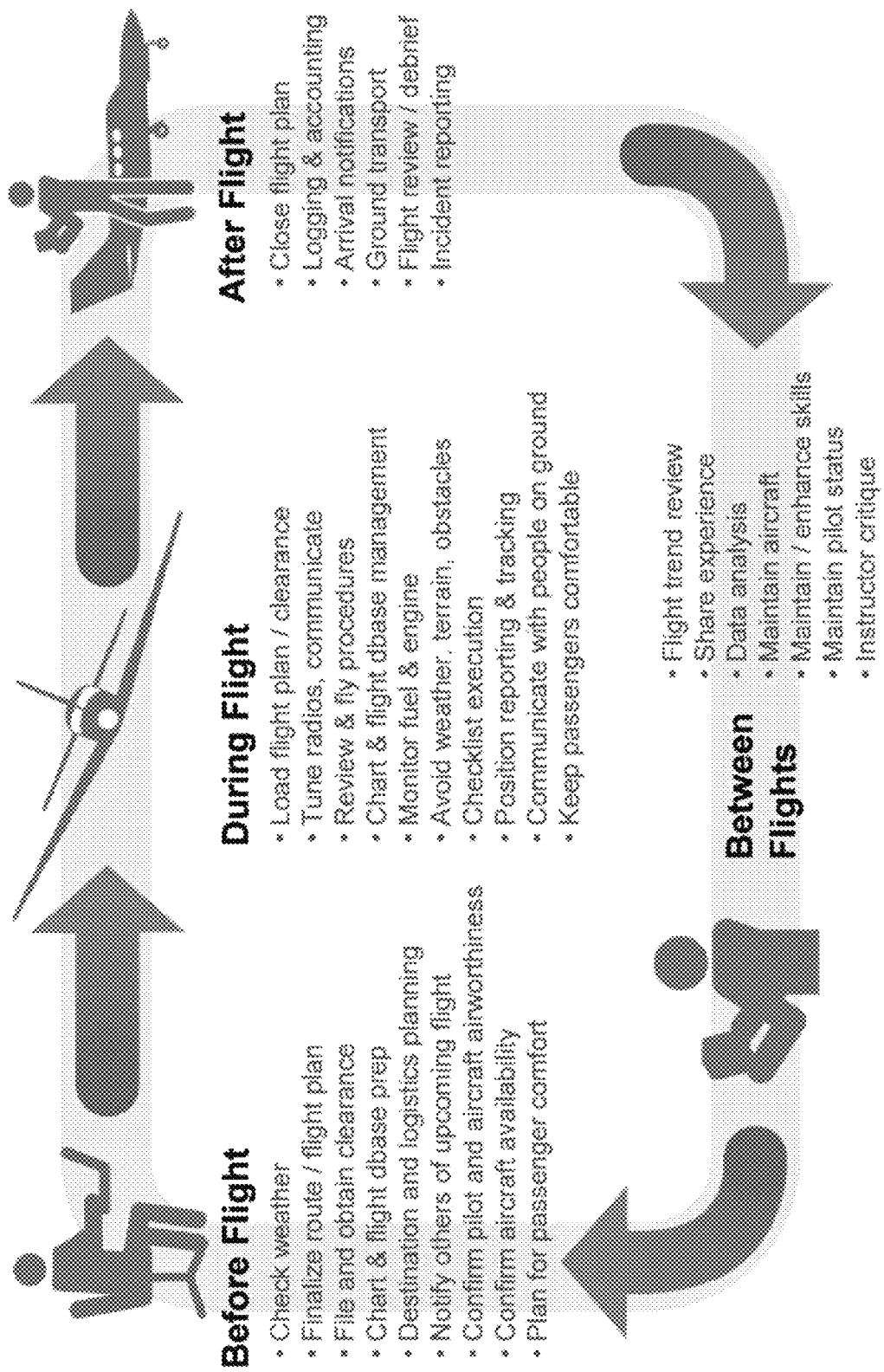
FIG. 2 is the end-to-end flight experience employing non-certified devices enabled by a gateway of the general inventive concept.

The gateway is designed to operate with a pre-defined Application Programming Interface ("API"). Third-party software developers use the API specifications to develop apps for mobile devices (i.e., non-certified devices) that access data and functions on avionics equipment (i.e., FAA-certified devices) that are connected to the gateway. For example, but not by way of limitation, if the gateway is connected to ASPEN'S EFD, navigation and communications device data are accessible via the EFD. In alternative examples, multiple FAA-certified devices are connected to and accessible via the gateway. The methods used to acknowledge, confirm and validate are not limited to being resident in ASPEN'S EFD. The methods, hardware and/or software, can be included as part of any FAA-certified device that operates as the FAA-certified interface The gateway, when used in combination with third-party non-certified devices and existing and yet-to-be-developed third-party software applications, allows users to streamline the end-to-end flight experience. With the gateway, users can more efficiently coordinate and synchronize efforts on-the-ground before and after flights. The gateway allows users to use information necessary for flight and collected during flight as well as analytics available between flights. Referring to FIG. 2, before flight, a pilot uses non-certified devices to accomplish tasks such as check the latest weather developments, plan a flight, finalize a flight route, file and obtain clearance, prepare and update charts and flight databases, plan for destination logistics, notify others of upcoming flight, confirm pilot and aircraft airworthiness, confirm aircraft availability, and plan for passenger comfort. Referring to FIG. 2, during flight, a pilot uses non-certified devices to interface with FAA-certified devices, via the gateway, to accomplish tasks such as load flight plan and clearance to the avionics systems, tune radios and communicate with others, review and perform flight procedures, manage charts and flight databases, monitor fuel and engine operations, avoid weather, terrain, and obstacles, execute checklist, report and track position, communicate with people on the ground, and keep passengers comfortable. Referring to FIG. 2, after flight, a pilot uses non-certified devices to accomplish tasks such as close the flight plan, flight log entry, notify others of arrival, arrange for ground transportation, review flight and debrief, and report any incidents. Referring to FIG. 2, between flights, a pilot uses non-certified devices and information gathered from avionics devices to accomplish tasks such as review flight trends, share experience, analyze data, maintain aircraft, maintain and enhance skills, maintain pilot status, and critique instructor.

In some embodiments, the general inventive concept also includes a security key feature. The security key feature provides an option for a subscription arrangement in using the gateway. If a user cancels the subscription, then that user's specific security key is deactivated and that user can no longer access the gateway. In some embodiments, the security key feature is specific to each app (e.g., the app developer is issued the security key for a specific app). In other embodiments, the security key feature is specific to each user (e.g., each mobile device is issued a unique security key regardless of what apps are used by that device). If an app developer creates an app that somehow damages or improperly interferes with the gateway or an FAA-certified device, the relevant security keys are deactivated and the problematic app and/or user can no longer interface with the gateway. Thus, even if the developer published a pirate app online, it does not function for any user thanks to this security key feature.

Figure 3:
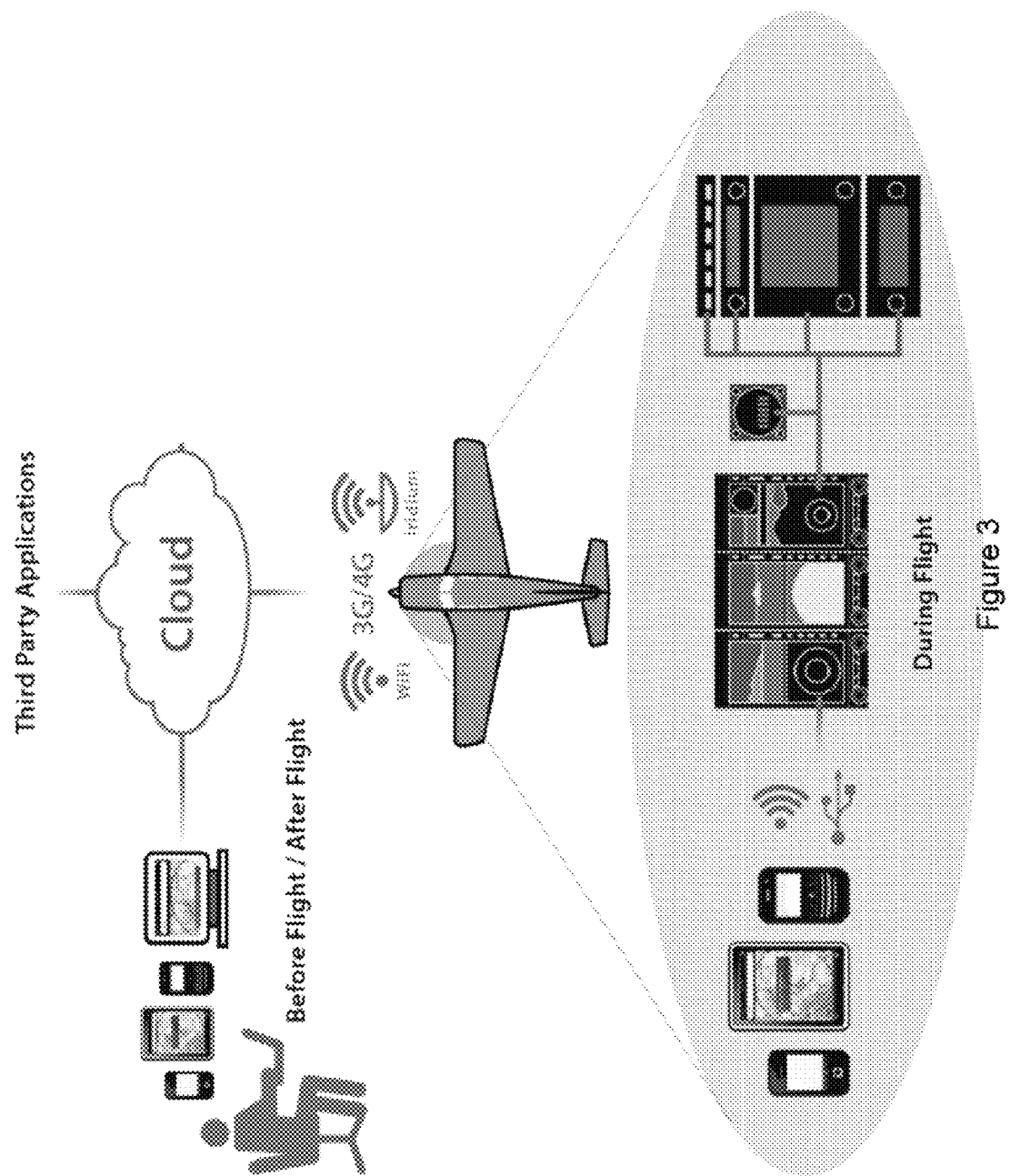
FIG. 3 is an exemplary embodiment of the general inventive concept where a gateway is used in the cockpit of an aircraft allowing a pilot to coordinate tasks performed on non-certified devices before and after flight with tasks performed during flight on non-certified devices and interfacing with FAA-certified devices.

Referring to FIG. 3, a gateway of an embodiment the present general inventive concept is installed in the cockpit of an aircraft and interfaces with FAA-certified devices. The gateway provides a wireless access point within the cockpit of the aircraft such that non-certified devices can access and communicate with FAA-certified devices of the aircraft. Alternatively or additionally, the gateway provides a wired (e.g., USB) connection for non-certified devices. The pilot performs certain tasks before flight, after flight, and between flights on a non-certified device. During flight, the pilot uses a non-certified device to access information and functions of the FAA-certified devices that interface with the gateway.

For example, and not by way of limitation, in a preferred embodiment, the gateway complies with DO-160E environmental conditions requirements. In this example, the gateway meets the requirements under a non-interference mode. The gateway will not interfere with avionics equipment, but may be susceptible to interference from other devices. The gateway is not certified as a critical device. The gateway is a non-essential, non-critical hardware and software component that should not cause interference to the aircraft but whose function may be degraded by noise or environmental conditions. Those skilled in the art will recognize that other configurations and alternative embodiments are equally viable where the software and/or hardware are fully certified by the FAA.

Figure 4:
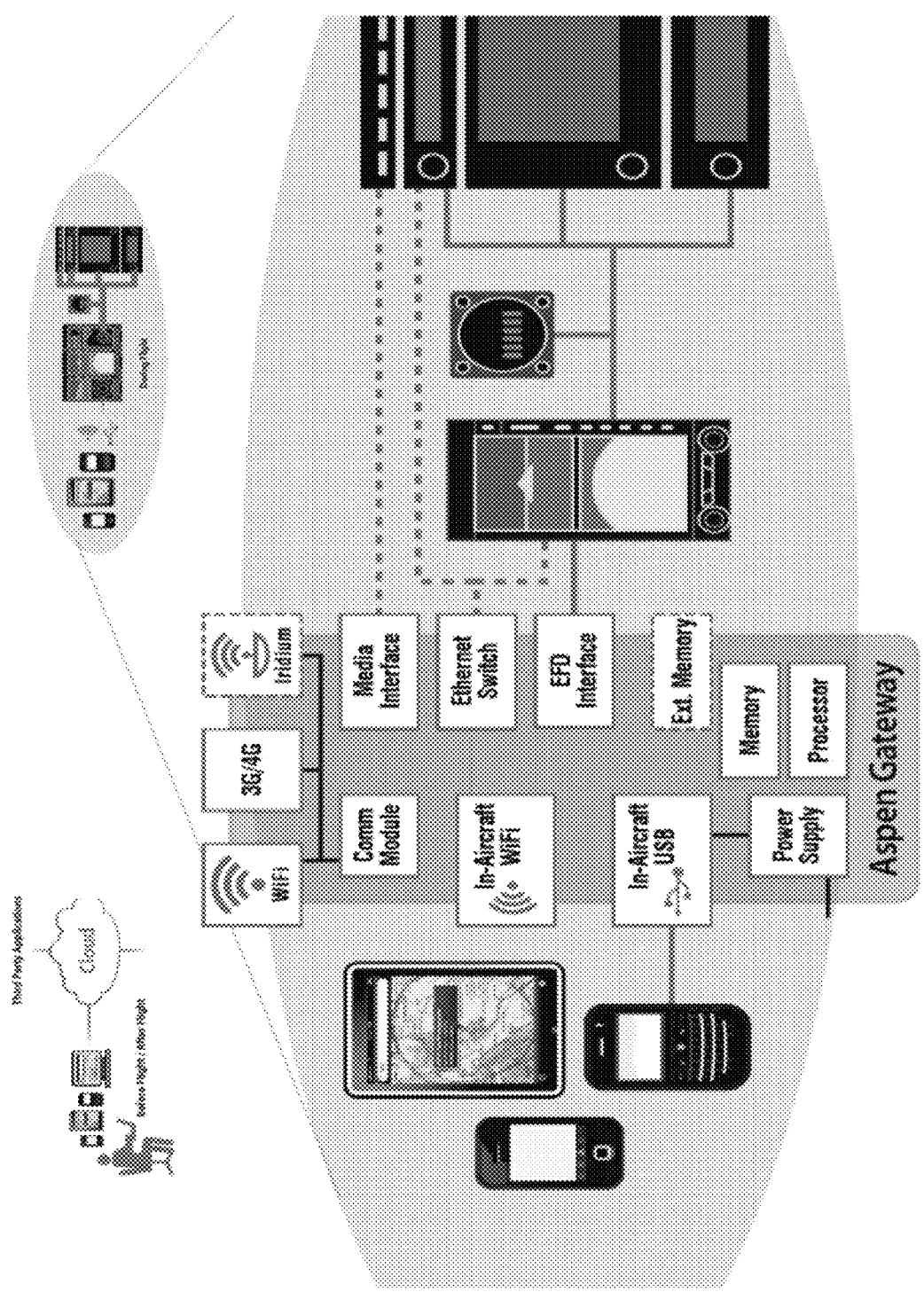
FIG. 4 is a detailed view of the gateway shown in FIG. 3.

Referring to FIG. 4, a detailed view of the gateway of FIG. 3 is provided. As shown in FIG. 4, the gateway includes a communication module that provides in-aircraft telecommunications connectivity. As shown in FIG. 4, in-aircraft telecommunications connectivity is WiFi, 3G/4G cellular, Iridium satellite, or USB. The gateway is connected to a power supply. The power supply may be self contained within the gateway (e.g., battery operated), connected to any aircraft power supply system (including an FAA-certified device), or both (one or the other with backup for redundancy). The gateway includes a processor and memory storage, with optional additional external memory interface (e.g., a memory card).

According to FIG. 4, the gateway includes several available interface options for connectivity to FAA-certified devices. According to FIG. 4, the gateway connects directly to ASPEN'S EFD multi-function flight display or other similar device via an Ethernet connection. According to FIG. 4, other FAA-certified devices are connected to the EFD or other similar device and are thus accessible via the gateway-EFD (or other similar device) connection. According to FIG. 4, some additional FAA-certified devices, such as communication and navigation devices, are optionally directly connected to the gateway via Ethernet, ARINC429 (RS232), or other media interface.

Figure 5:
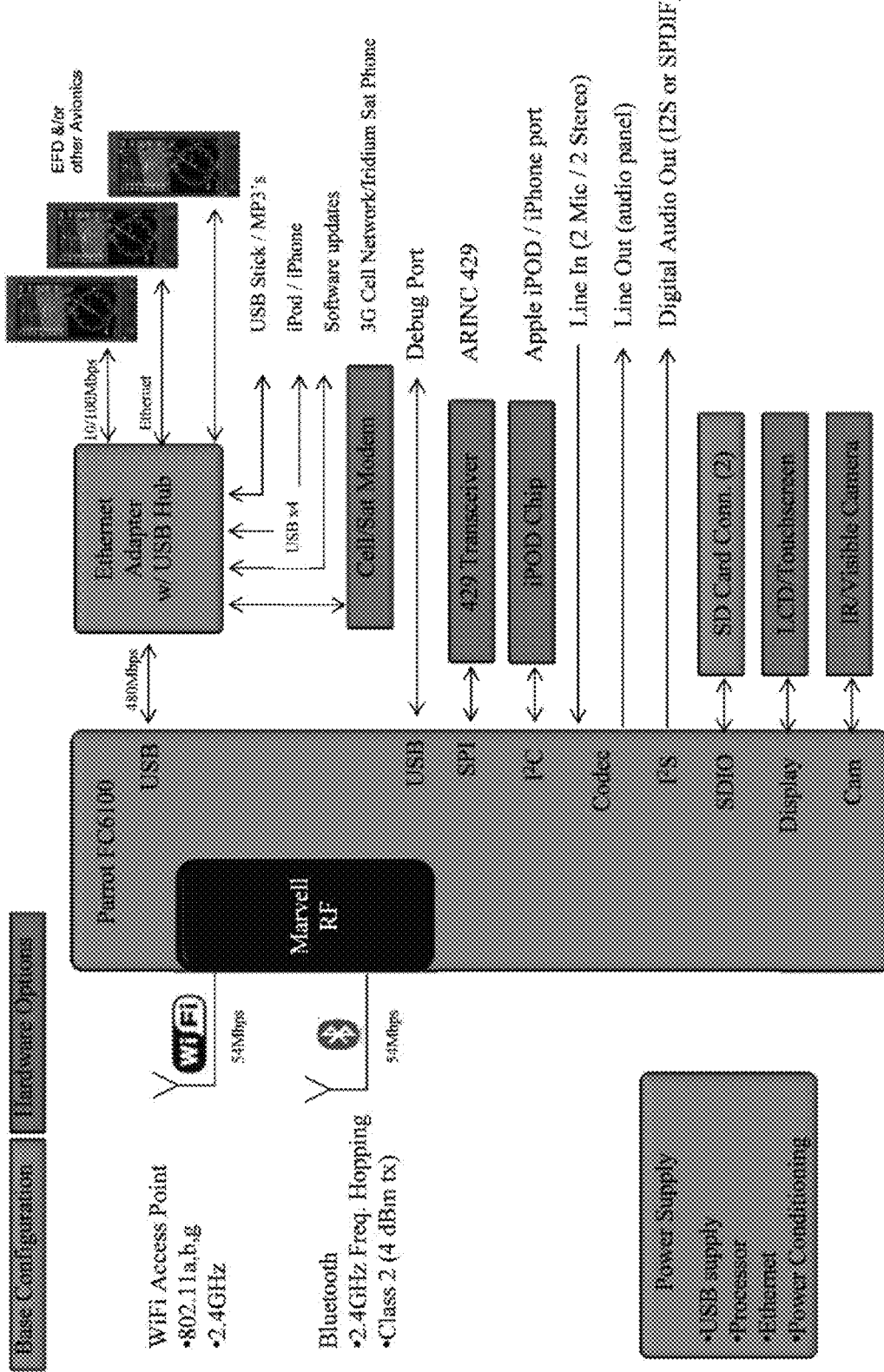
FIG. 5 is another exemplary embodiment of a gateway of the present general inventive concept.

In a preferred embodiment, the gateway module is based on the PARROT FC6100 processing platform. The FC6100 provides the system processor and several key electrical interconnects including a wireless interface (WiFi and BLUETOOTH). The FC6100 is hosted by a custom motherboard designed to provide power to the FC6100, connectors to interface to other modules, and external antennas for the BLUETOOTH and WiFi radios. FIG. 5 shows a block diagram of the gateway hardware. Optional items are not required to support the basic functionality, but would provide a more flexible hardware solution allowing for application growth in the future.

Referring to FIG. 5, a preferred exemplary embodiment of a gateway of the present general inventive concept is provided by way of example, and not by way of limitation. According to the example shown in FIG. 5, the gateway includes a PARROT FC6100 processor chip. According to the example shown in FIG. 5, the gateway includes a MARVELL radio-frequency integrated circuit. According to FIG. 4, the gateway includes a power supply to provide power to the processor, the USB connections, and the Ethernet connections. According to FIG. 5, the gateway includes connections for USB, SPI (SR232), APPLE I2C chip for iPOD/iPHONE port, audio ports (Line In: 2 mic and 2 stereo/Line Out: audio panel), digital audio ports, external memory card slots (SD×2), visual display (LCD/touchscreen), and camera (infrared and/or visible camera). According to FIG. 5, one of the two USB ports connects to an Ethernet adapter with USB hub to provide multiple Ethernet connection ports and additional USB ports. These multiple Ethernet ports connect to ASPEN'S EFD and/or other FAA-certified devices. The additional USB ports are used for software updates, iPOD/iPAD interface, additional external memory devices, digital media players, 3G/4G cellular network, and/or Iridium Satellite phone connections. According to FIG. 5, the gateway provides an access point to a wireless network via WiFi and/or BLUETOOTH.

In the preferred embodiment, the gateway includes two SD card slots for internal data storage. The purpose of the primary card is to store Android OS, user applications, and application data. The purpose of the secondary card is to store application data, flight logs, data recorder, information, and entertainment media. In the preferred embodiment, the gateway includes a connection to standard avionics audio panels. This feature is used to support multimedia applications. The gateway streams media from connected mobile devices, a local SD card, or from Bluetooth connected devices. In addition, a microphone input is used for voice controlled functionality (i.e., voice-recognition). In the preferred embodiment, the gateway includes an ARINC 429 interface to allow the gateway to be installed in aircraft without an ASPEN EFD, allowing the gateway to interface directly with legacy avionics equipment, such as air data, inertial, navigation, flight control, or other similar aircraft computing systems.

Figure 6:
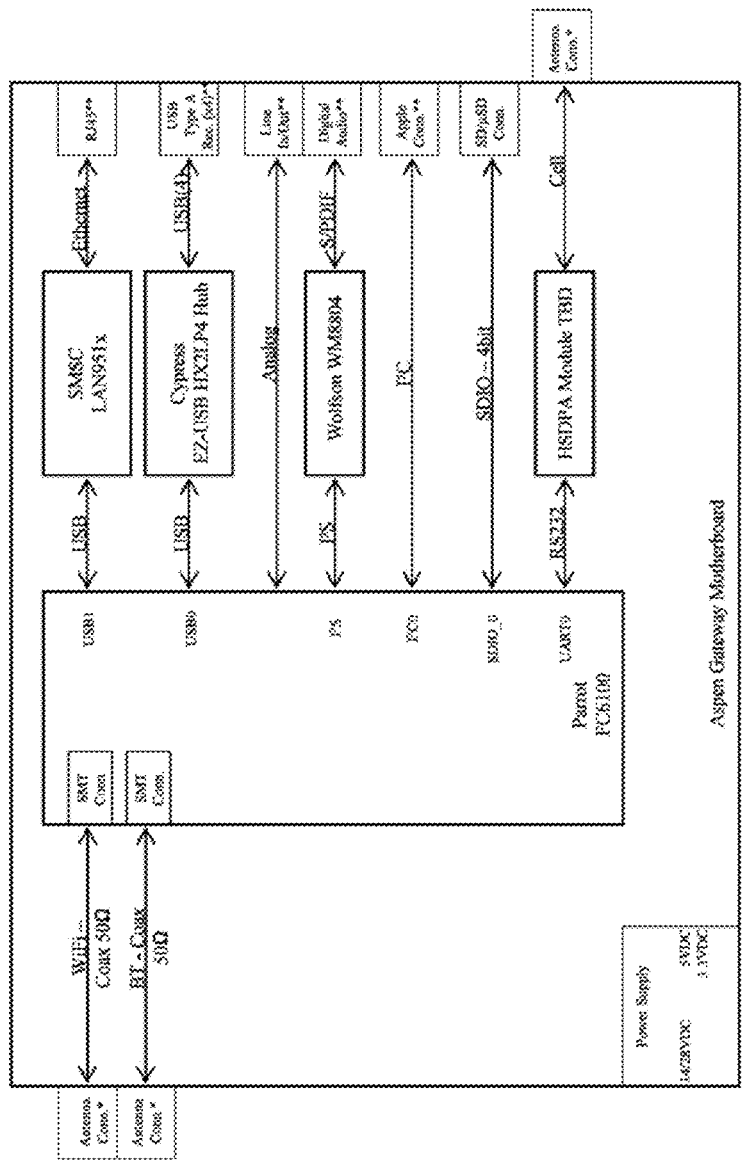
FIG. 6 is an embodiment of a gateway of the present general inventive concept with a single Ethernet port.
Figure 7:
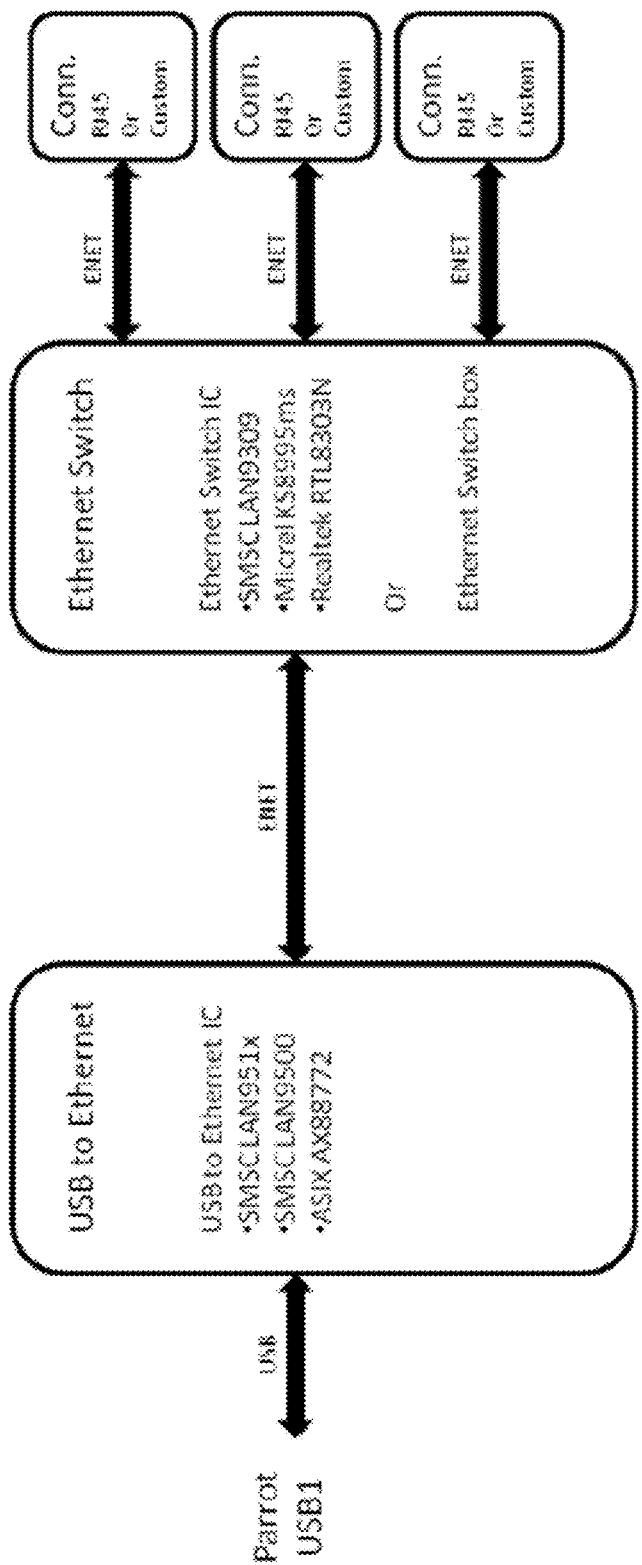
FIG. 7 is a detailed view of an Ethernet connectivity option of a gateway of the present general inventive concept where a switch is added to the gateway to provide additional Ethernet ports.
Figure 8:
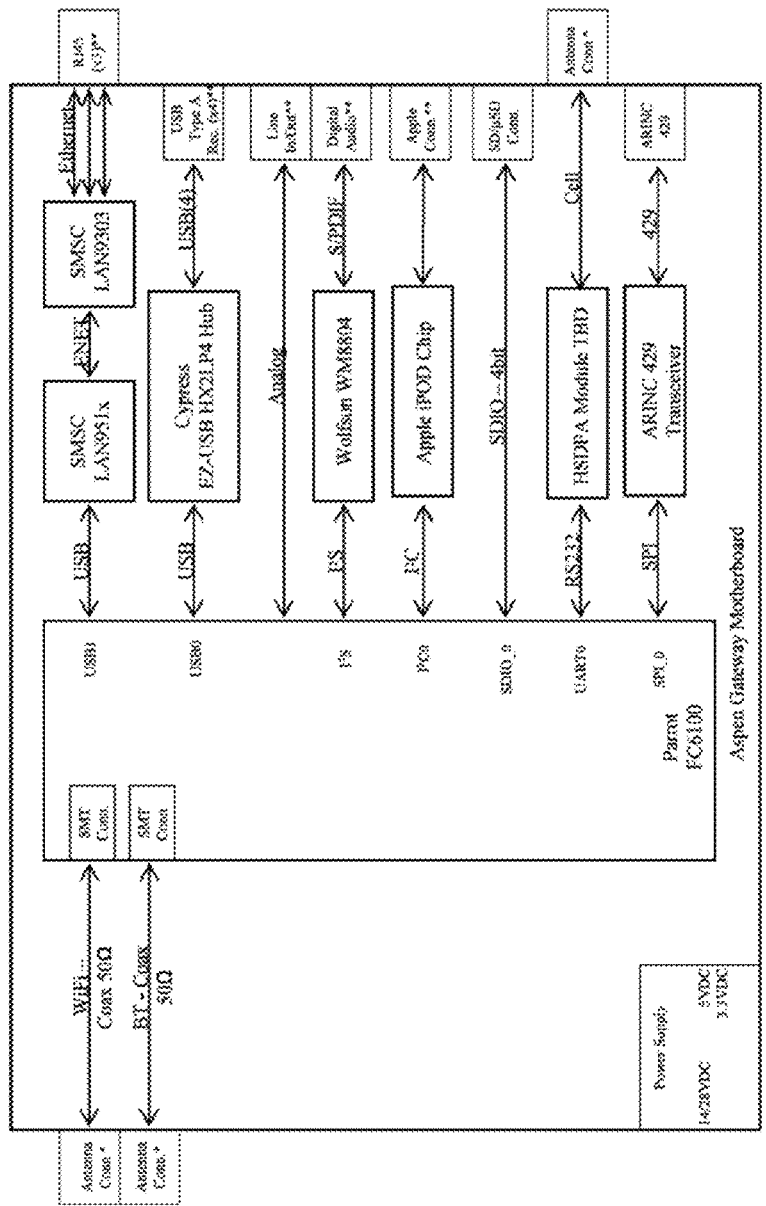
FIG. 8 is an embodiment of a gateway of the present general inventive concept configured to include three Ethernet ports.

FIG. 6 shows an embodiment of a gateway of the present general inventive concept with a single Ethernet port. FIG. 7 shows a detailed view of an Ethernet connectivity option of a gateway of the present general inventive concept where a switch is added to the gateway to provide additional Ethernet ports. FIG. 8 shows an embodiment of a gateway of the present general inventive concept configured to include three Ethernet ports.

By way of example, and not by way of limitation, an EFD or other similar device includes multiple screen configurations that are certified screens (on a certified device, displaying certified data, in a certified format). In this example, the EFD or other similar device further includes an additional non-certified screen. The non-certified screen displays information from the app off of the non-certified device. The additional non-certified screen is uncertified. It includes uncertified controls in order to control the uncertified display. One skilled in the art will recognize that this is but one example and that many other examples are available.

Software applications developed for non-certified devices are common. By interfacing directly with FAA-certified devices via a gateway of the present general inventive concept, a number of software applications have been developed to enhance the flight experience. Several examples of software applications are provided herein, however, it should be recognized that many other software applications will also benefit from interfacing with the gateway.

Most applications running on the gateway, itself, function as Android Services. Services are application components that perform background operations and do not have user interfaces. The services provide the functionality required to transfer data between non-certified devices and FAA-certified devices.

Example 1

Flight Planning Application

The flight planning application allows a pilot to perform standard flight planning activities on an application running on a non-certified device. When the non-certified device is connected to the gateway, the flight plan is synchronized with the connected Navigation device (i.e., FAA-certified). If the pilot desires to make further updates, he or she does so directly on the Navigation device (FAA-certified) or through the mobile application (non-certified). All changes are continuously synchronized in real time between the mobile application and the Navigation unit through the gateway.

Figure 9:
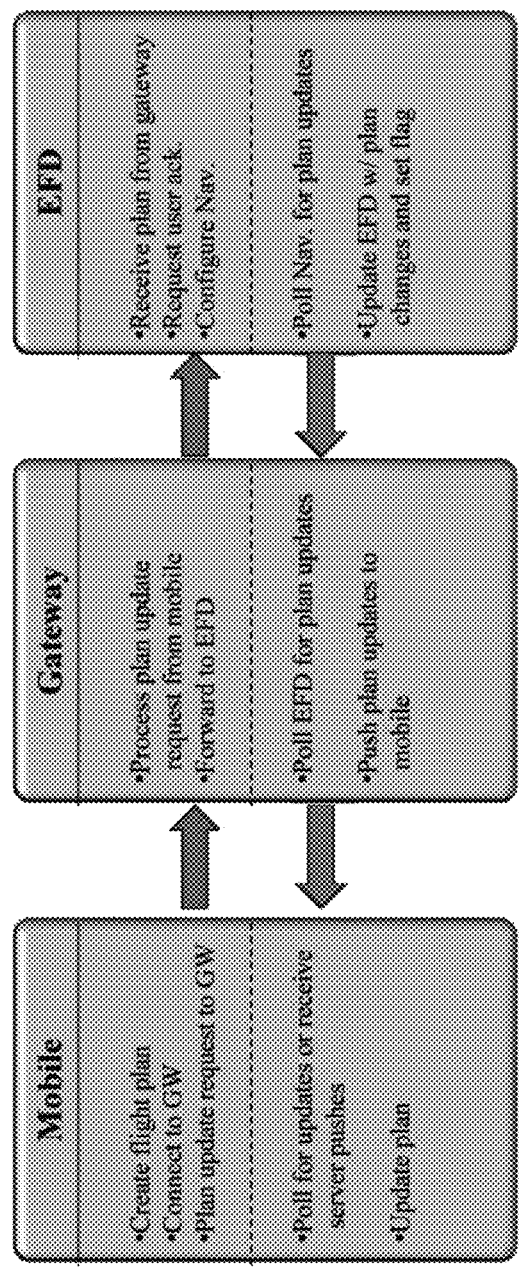
FIG. 9 is a flow chart showing how a flight planning software application interfaces between a non-certified device and an FAA-certified device via a gateway of the present general inventive concept.

Referring to FIG. 9, a flow chart showing how a flight planning software application interfaces between a non-certified device and an FAA-certified device via a gateway of the present general inventive concept is provided. According to FIG. 9, a pilot creates or updates a flight plan on a mobile, non-certified device. The non-certified device is connected to the gateway. Preferably, the non-certified device connects to the gateway wirelessly, via WiFi or BlueTooth, however, a hardwire USB connection or other connection is possible. According to FIG. 9, the software application sends a request to the gateway indicating a new (or updated) flight plan (this can be initiated automatically by the software application, or manually by input from the pilot). A software/firmware application (or service) on the gateway processes the planned update request from the non-certified device and forwards the request to the FAA-certified device (e.g., ASPEN'S EFD or other similar device). According to FIG. 9, the FAA-certified device (e.g., ASPEN'S EFD or other similar device) receives the new or updated flight plan from the gateway. Before any changes take effect, the FAA-certified devices requests user acknowledgement and confirmation. Only after acknowledgement is received on an FAA-certified device is the Navigation system updated with the new or updated flight plan.

According to FIG. 9, after the pilot acknowledges the changes on the EFD or other similar device, the navigation system is updated with the new or updated flight plan. The EFD or other similar device is updated with plan changes and appropriate flags and indicators are set. The EFD or other similar device provides flight plan updates to the gateway. The gateway processes the flight plan updates from the EFD or other similar device and communicates with the mobile application to update the flight plan on the non-certified device. In this manner, a flight plan is synchronized on both non-certified devices and FAA-certified devices, before and during flight.

The step of acknowledgement on the FAA-certified device maintains the certified status of the FAA-certified equipment. The non-certified device does not interfere with any of the FAA-certified devices. The non-certified device is not allowed to make any changes or adjustments to any FAA-certified device other than to present data to be previewed and acted upon by the pilot. The acknowledgement on the FAA-certified device allows changes to information or functionality of the FAA-certified device, not anything received directly from any non-certified device. It will be appreciated that in various embodiments of the inventive concept information/data will flow from the non-certified device (e.g. an iPad) to the FAA-certified (e.g. EFD or other similar device) in various manners. In some embodiments, information/data is uploaded from the non-certified device to the gateway and stored in a memory device in the gateway until the pilot acknowledges the request. At that point, when acknowledgement is made/completed, the information is uploaded from the gateway into the FAA-certified device. In some embodiments, multiple copies of the information are kept on any or all of the FAA-certified device, the non-certified device and the gateway and are "synced" together periodically to keep all copies current. In other embodiments, information/data from the non-certified device is stored on the gateway and small packets of data are released in increments to the FAA-certified device from the gateway post-acknowledgement as such data is needed by the FAA-certified device. It will further be appreciated that in some embodiments of the instant inventive concept, the gateway (or a software application/service on the gateway) pushes the request for acknowledgement to the FAA-certified device. In other embodiments, the gateway pushes the information/data to the FAA-certified device, and upon receipt of such new information/data, the FAA-certified device generates the request for acknowledgement before accepting said data. It will be appreciated that in such embodiments in which the FAA-certified device generates the request for acknowledgement, the new information/data may be stored in a temporary memory location in the FAA-certified device until acknowledgement is completed.

Figure 10:
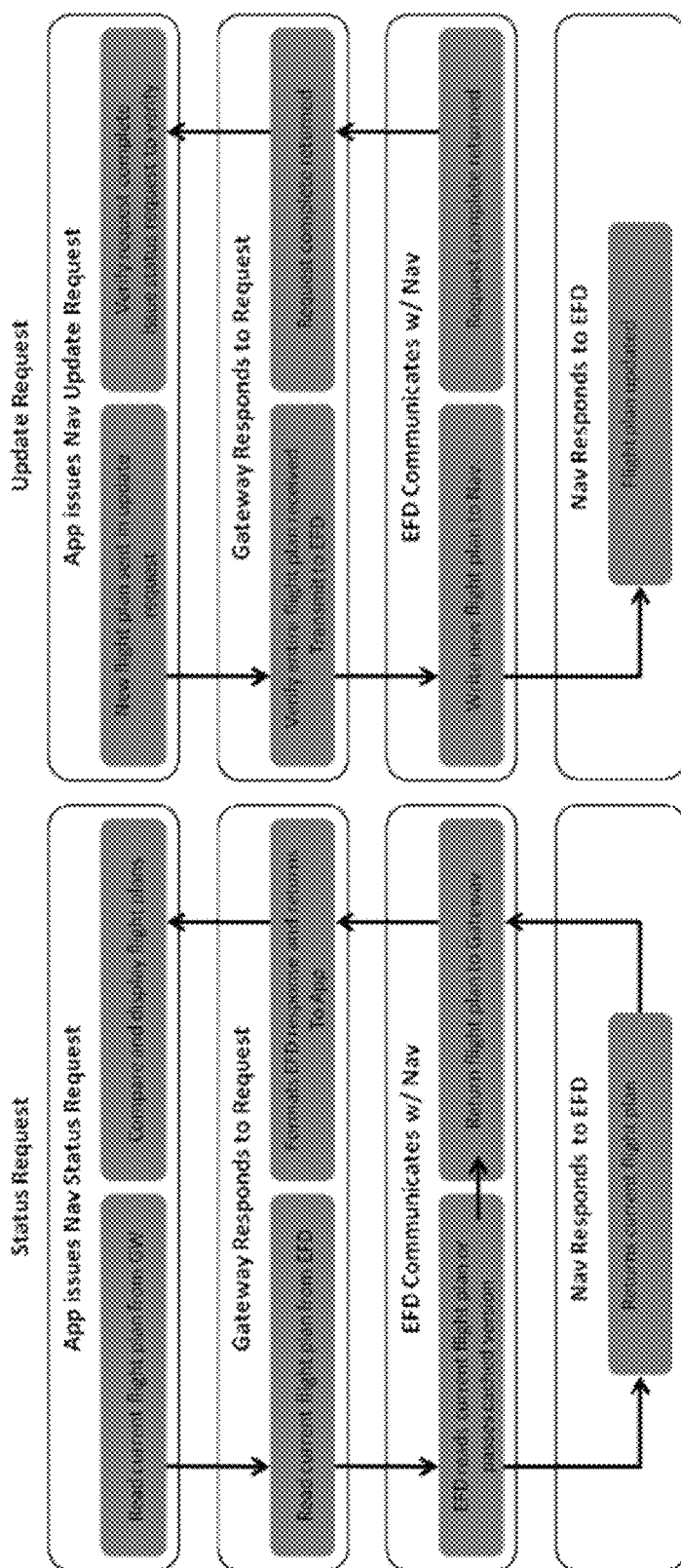
FIG. 10 is a flow chart showing how a flight planning service application functions on a gateway of the present general inventive concept.

On the gateway, the flight planner service will facilitate the coordination of flight plans between the Navigation unit and the mobile application. The gateway will act as a conduit for Navigation flight plans. This service will act much like a web server responding to client pull requests from a mobile application. Requests will take two forms, request for current Navigation flight plan and request for a Navigation flight plan update which will be accompanied by a new flight plan. The gateway service converts, if necessary, from a format used to communicate with the mobile app to the EFD format. The flight planner service must verify the integrity of the new flight plan before sending to the EFD/Navigation unit. The gateway may poll the EFD and cache results to allow for timely responses to mobile app requests. Referring to FIG. 10, a flow chart showing how the gateway flight planner service functions is shown.

Example 2

Flight Control Application

The flight control application provides control over the communications equipment. This functionality may optionally also be combined with the flight planning application but preferably is separate. The flight control application allows the pilot to tune the radio to the appropriate frequencies via the gateway.

Figure 11:
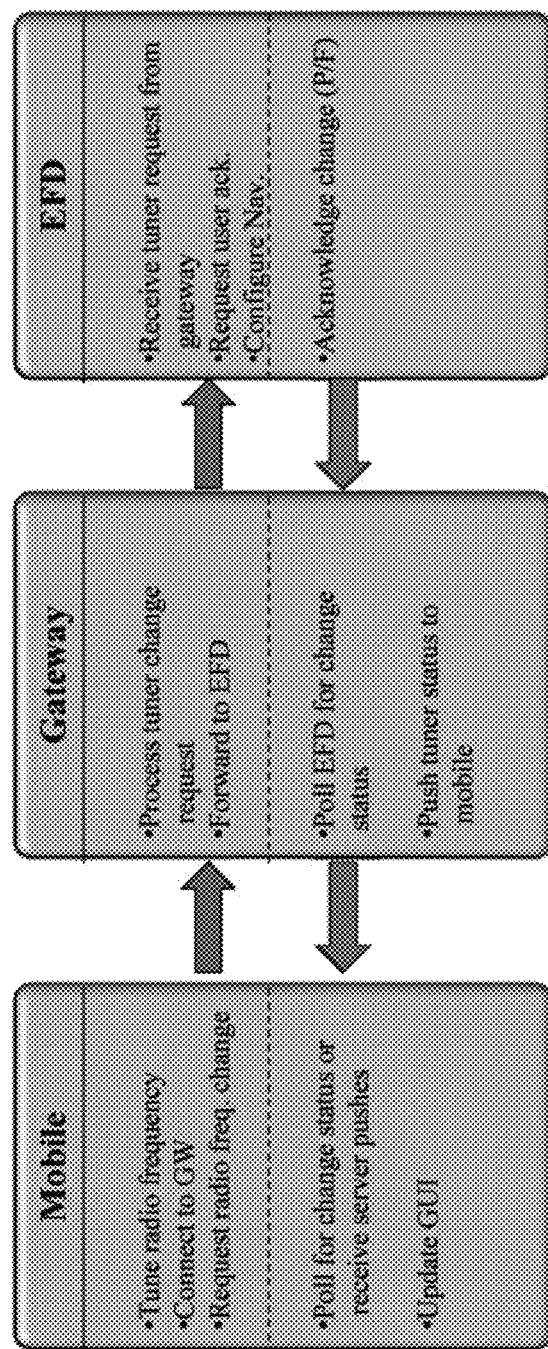
FIG. 11 is a flow chart showing how a flight control/radio tuning software application interfaces between a non-certified device and an FAA-certified device via a gateway of the present general inventive concept.

Referring to FIG. 11, a flow chart showing how a flight control/radio tuning software application of one embodiment of the instant inventive concept interfaces between a non-certified device and an FAA-certified device via a gateway of the present general inventive concept is shown. According to FIG. 11, a pilot tunes or selects a radio frequency using a software application on a non-certified device (this can be done in real time on the non-certified device, or alternatively may have been predetermined during the pilots preflight planning on the non-certified device and then initiated automatically by the software application based upon location or some other predetermined flight status criteria). The application connects the non-certified device to the gateway to request a radio frequency change. The gateway processes the radio frequency tuner change request and connects to the EFD or other similar device (FAA-certified device). The EFD or other similar device receives the radio frequency tuner change request and requests user acknowledgement via an FAA-certified device (e.g., the EFD or other similar device). Only after the pilot confirms the radio tuner frequency change on the EFD or other similar device is the radio frequency changed to the new frequency. In some embodiments, the gateway then communicates directly with the radio to change the frequency. The EFD or other similar device provides an update to the gateway and the gateway updates the non-certified device. In other embodiments, the EFD or other similar device communicates with the radio (a "downstream" device to the EFD) to change the frequency. In an alternative embodiment, instead of sending a change request to the EFD or other similar device for the user to acknowledge, the gateway pushes the selected radio frequency to a "standby" frequency control of the radio, which is activated (or, from a broad perspective, "acknowledged) by the pilot/user by selecting/operating a control on the radio user interface that activates the standby frequency.

Figure 12:
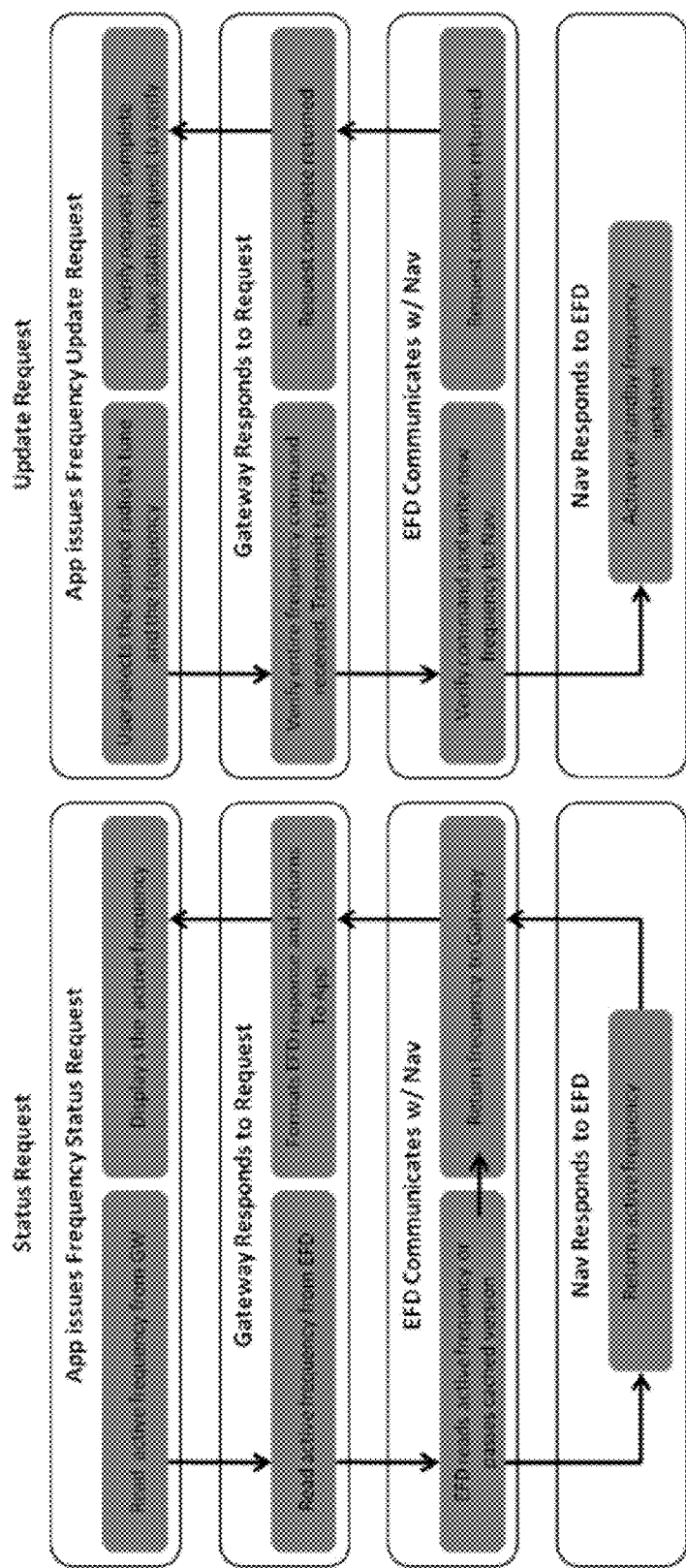
FIG. 12 is a flow chart showing how a radio tuning software service application functions on a gateway of the present general inventive concept.

On the gateway, navigation and communication radio frequencies will be accessed through the flight control service. A mobile application will provide an interface for selecting radio frequencies. The application will issue a radio frequency change request to the gateway, which will in turn send a packet to the EFD or other similar device with the radio tuning message. The EFD or other similar device will command the Navigation radio through an ARINC 429 or RS-232 serial bus. The gateway will respond to the application that the request was completed by the EFD or other similar device. By way of example, and not by way of limitation, the application also has the ability to query the current active radio frequency from the Navigation radio unit. Referring to FIG. 12, a flow chart showing how a radio tuning software service application functions on a gateway of the present general inventive concept is provided.

One skilled in the art will recognize that this is but one example of how the flight control application may be implemented. In other embodiments, the acknowledgement does not occur through the EFD or other similar device for radio tuning. Instead, the frequency is automatically pushed to the "standby" window of the radio's Nav/Com. The pilot acknowledges the frequency by activating the frequency on the radio from "standby" to "active". One skilled in the art will readily recognize that many other embodiments are available.

Example 3

Pilot's Logbook Application

Figure 13:
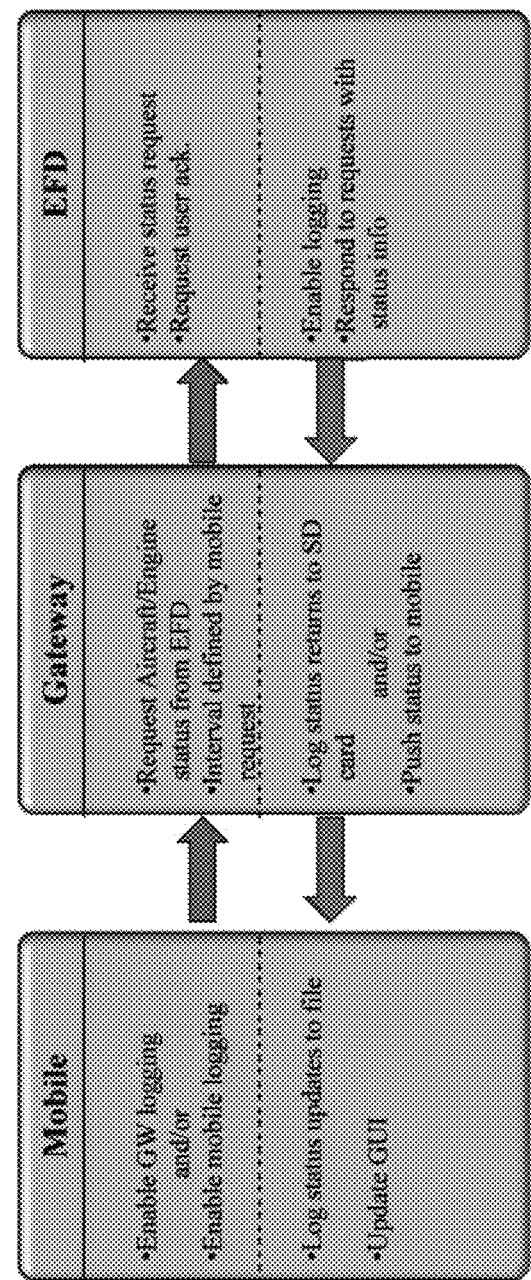
FIG. 13 is a flow chart showing how a flight log book software application interfaces between a non-certified device and an FAA-certified device via a gateway of the present general inventive concept.

Referring to FIG. 13, a flow chart showing how a flight log book software application interfaces between a non-certified device and an FAA-certified device via a gateway of the present general inventive concept is provided. According to FIG. 13, a pilot initiates logging via a software application on a non-certified device (this can be done in real time on the non-certified device, or alternatively may have been predetermined during the pilot's preflight planning on the non-certified device and then initiated automatically by the software application based upon location or some other predetermined flight status criteria). The logging app records pilot hours and aircraft performance data. The application sends a request to the gateway to initiate logging. The gateway processes the request and requests aircraft and/or engine status from the EFD or other similar device. The EFD or other similar device receives the request and seeks confirmation from the pilot on the EFD (FAA-certified device). Only after receiving pilot acknowledgement on the EFD does the EFD provide aircraft and/or engine status (or other information to be logged) to the gateway. The gateway stores the log information on an external memory card or forwards it on to the non-certified device for storage.

Figure 14:
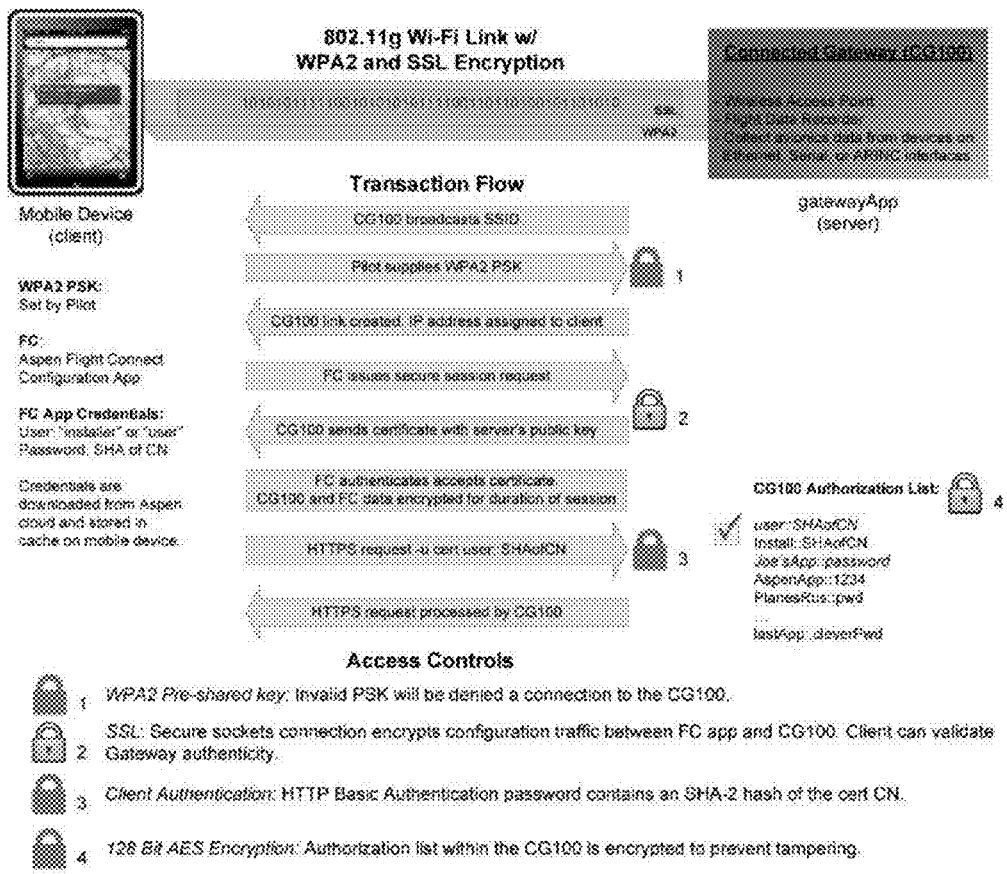
FIG. 14 is a flow chart showing one exemplary embodiment of secured access protocols for communication between a non-certified mobile computing device and a wireless gateway in a system of the present general inventive concept.

In some embodiments, the method includes a method for implementing client authentication protocols with a mobile web server of a gateway device of an embodiment of the invention. Referring to FIG. 14, the method allows for client authentication with a mobile web server of a gateway that does not have its own internet connection. The system is comprised of three computing nodes: a) a license server issuing license keys to client devices; b) a client device (mobile computing device, tablet, smart phone, etc.) accessing data resources within a mobile server; and c) a mobile web server authenticating and servicing client requests for data. The mobile web server authenticates the client without having access to a certificate authority.

The mobile webserver is a component of the gateway, which is connected to a FAA-certified device. In a preferred embodiment the connection between the gateway and the FAA-certified device is a hard wired Ethernet connection; however it will be appreciated that other embodiments utilize a wireless connection. In a preferred embodiment, the client device (or devices) is connected to the mobile server via a wireless connection. Nevertheless, it will be appreciated that other embodiments utilize a wired connection.

In some embodiments, the mobile web server prevents client devices (e.g. non-certified mobile computing devices) from accessing any functionality of the gateway if the mobile server has not authenticated the client device. In other embodiments, mobile devices that are not authenticated are only prevented from accessing data resources of the mobile server, such as communicating with (i.e. accessing data from, reading from, writing to and/or transmitting to) FAA-certified devices connected to the gateway and/or accessing any data stored on or accessible by the gateway from or relating to the FAA-certified devices, but otherwise are allowed to access functionality of the gateway that is separate from the mobile service and/or FAA-certified devices. For example, in one embodiment, a client device that has not been authenticated is permitted to network (assuming the device has been authenticated through any other security protocols for connecting to the gateway— such as WPA or WPA2 SSID and password if the network connection is a wireless connection) with other non-authenticated mobile devices (e.g. as in a typical computer network) and/or with an Internet connection that is connected to the gateway (if the gateway is so connected). In this manner, the gateway may function as network router between non-authenticated mobile devices (such as those used by aircraft passengers) and entertainment or other non-FAA certified data resources, while at the same time functioning as a platform for two-way communication between authenticated non-certified devices and FAA certified devices/resources.

Referring to FIG. 14, the method includes generating an encrypted license key for a mobile server in operable data connection with said FAA-certified device. An encrypted license key is generated for each mobile server device. The key is a hash of something specific to the mobile server device (Serial Number, MAC address, etc.). The algorithm for generating the key can remain proprietary to the gateway manufacturer and need not be shared with the general public. The algorithm for generating the license key is known only to the mobile server (i.e. stored in memory of the mobile server) and the license server. The client device does not decrypt the key. The algorithm for decrypting the key is not held within the client device application code, preventing the algorithm from being reverse engineered from the binary.

The license key is hosted on a license server. The client device connects to the license server (via an Internet connection or other suitable data connection) and downloads the key from the license server after providing authorization credentials (Account information, SN, MAC address, etc., from the purchased mobile device server documentation) to the license server. A client app on the client device downloads the key and stores it within cache on the mobile device. The connection between the client device and license server is encrypted with SSL or another suitable method to preserve the integrity of the key. The client device establishes a connection with the mobile server and requests access to certain targeted data resources. The license key is issued with each request or is cached for each session. The network session is encrypted with SSL or another method to preserve the integrity of the license key as it is passed from the client to mobile server. If the network connection is wireless, the channel is encrypted. The mobile server decrypts and validates the key before authorizing access.

In some embodiments, the general inventive concept provides a system for transmitting and receiving aircraft data communications between cockpit avionics and mobile devices (i.e., between FAA-certified and non-certified devices). Referring to FIG. 15, the system includes an FAA-certified device that provides AHRS, ADC, navigation, communication or flight plan data. The FAA-certified device is configured to restrict receiving data from non-certified devices such that non-certified devices do not interfere with normal operation of the FAA-certified device. The system also includes at least one non-certified mobile computing device that is configured to send and receive data.

The system includes a display that is configured to display data that is targeted to be received by the FAA-certified device from the non-certified mobile computing device. The display is a piece of hardware that allows user inputs as a confirmation so that the pilot can accept or reject the targeted data prior to loading the targeted data to the FAA-certified device. If the targeted data is accepted, then the targeted data is allowed to change information or functionality of the FAA-certified device. However, if the targeted data is not accepted or if it is rejected by the user, then the targeted data is not allowed to change information or functionality of any FAA-certified device. This display hardware is installed on a multi-function display, such as the ASPEN Evolution Backup Display, or any other similar device.

Referring to FIG. 15, the display is sometimes referred to as a scratchpad hardware. Any device that can display textual information (with graphic display a useful option) and can accept at least two distinct user responses (Yes and No) can be used for this function. The software functionality it needs to support is intentionally minimal for two reasons. First, it will place a very low burden on the display (scratchpad hardware) memory and graphics function. Second, the gateway can be used with multiple avionics display manufacturers with reduced risk of incompatibility. The display simply needs to accept a small number of well-defined inputs from the gateway, display them for the user (text only or, if capable, text and appropriate graphics) and transmit the user's Yes or No response back to the gateway.

The system includes an FAA-certified gateway hardware device. The gateway is configured to provide a secure data communication connection with the non-certified mobile computing device. The gateway is also configured to provide a separate secure data communication connection with the FAA-certified device. In some embodiments, the gateway is configured to provide a data filter or a firewall. In some embodiments, one or more of the secure data communication connections is a wireless data connection. In some embodiments, one or more of the secure data communication connections is a hard-wired data connection. In some embodiments, the gateway includes a secure data communication connection with the internet (i.e., the world wide web).

The gateway hardware includes a basic compute module, including RAM and flash memory, and I/Os. It includes sufficient processing power and memory to support relatively significant compute loads while having substantial reserve capacity for future expansion. I/O is supported via Ethernet, RS232, USB, ARINC and/or 429. Other interfaces include Bluetooth, cellular and Iridium. It supports a secure Wi-Fi connection to the non-certified device.

The gateway device includes software. It includes an operating system. In some embodiments, the operating system is ANDROID-based. The gateway also includes software to provide the secure data communication connection with the FAA-certified device. It also includes software to provide the secure data communication connection with the non-certified mobile computing device. It also includes software to provide targeted data confirmation protocols. The gateway software provides secure external and internal communications support, firewall services, verification services via internal filters and interaction with the display, reading and writing of data to and from the FAA-certified device after user confirmation/verification. The gateway software provides translation to and from function specific, capability driven "neutral" data formats and support of a Persistent Data Store (PDS) or localized memory store.

In some embodiments, sensor data, such as ADC, AHRS, OAT and/or navigator LAT/LONG is stored in a predetermined memory storage device, located locally on the gateway or elsewhere in the system. The sensor data may be obtained directly from sensors connected to the gateway of the instant invention, or alternatively may be obtained by sensors connected to FAA-certified devices connected to the gateway. The data stored in the predetermined memory storage is available for bulk load by applications for later analysis as well as being available to application on a non-real time basis. In some embodiments, this latter is critical due to the non-multitasking nature of iOS (e. g. if a user suspends an application that is monitoring sensor streams by switching to another application, the monitoring application needs to be able to play "catch-up" when it is reactivated). The data store also maintains current and historical flight plan data in a pre-defined universal format which allows loading into a targeted navigator, or cross loading between navigators of different compatibilities, on a "capabilities" based basis.

In some embodiments of the invention, in which data in the data store originates from an FAA-certified device, the data store maintains a copy of the data that is on the FAA-certified device. In other embodiments, the data store maintains a matrix, lookup table, or pointer to the data that is stored in the FAA-certified device, without actually copying the data. In other embodiments, the data store maintains a copy of some data and a lookup table/pointer to other data of the FAA-certified device. In this manner, the non-certified mobile computing device can access and even manipulate the data within the data store, but not manipulate the data on the FAA-certified device without first receiving proper authorization through the targeted data confirmation protocols of the invention (as is discussed above). In some embodiments, when a change to data is made through the use of the non-certified mobile computing device, the software of the gateway device utilizes the scratchpad hardware discussed above with respect to FIG. 15 to obtain authorization to make a change to the data that is stored on the FAA-certified device.

The memory storage device of the gateway is a secure, persistent data store located inside and/or outside the certified environment data. In embodiments in which the PDS is located outside the certified environment data (such as in a gateway of the instant invention) outside validation of data with, for example, CRC codes is preferred before data may be written to and/or edited within the certified environment. In some embodiments, the memory storage device is physically contained in a section of flash memory located in the gateway. It is accessed by gateway software as well as by applications running inside the connected non-certified device. It will be appreciated that gateway of the instant invention may include multiple PDS and/or other storage environments. For example, in some embodiments, the gateway includes one PDS that is accessible and may be edited by the applications running on the connected non-certified device(s), and another PDS that is in an FAA-certified environment and therefore only accessible by (for receiving, reading, writing and/or transmitting data to or from) FAA-certified devices.

The memory storage device serves several main functions. In some embodiments, it stores installation (including aircraft type and registration number) and user defined configuration data. One portion is configured at installation time while the other is user editable, and is accessed from the non-certified device via a secure, password controlled program. The user configuration includes a variety of items such as frequency of waypoint, attitude, ADC, OAT info, frequency of sampling of Engine parameters, Retention cycle, etc.

In some embodiments, the memory storage device stores application configuration and state data. This allows multiple non-certified devices to be used with a single gateway on the same airplane. This also allows one to shift from one non-certified device to another during flight without losing key data (e. g. having a backup Tablet Computer). In some embodiments, it provides a place where an application can store any information it chooses. This store is divided into two sections—private and public. The private space is accessible only by the owning application. The other section is available to any application, whether on the originating Tablet Computer or another one. This, in effect, provides an interprocess communication channel between applications. In some embodiments, the store includes an extensible XML construct to allow the originating application to tag the data in the public area. There is a data registry associated with these public spaces so applications can query what public space data might be available to them.

In some embodiments, the memory storage device includes waypoint, attitude and engine data from each flight. This information is retrievable by each application but is only written by the FAA-certified device(s).

In some embodiments, the memory storage device includes incoming COM audio in digitized form, available when a compatible Audio Panel is installed. In some embodiments, it also contains the textual content of the message derived from the Speech Recognition engine running in the gateway as well as the parsed info and message categorization tag from the parsing engine, also running in the gateway.

In some embodiments, the memory storage device includes flight plans stored in a format such as ARINC 424 to allow for flight plan validation and interchange. By doing this, and tagging the active one(s) and identifying which Navigator it is loaded into, it simplifies interaction with non-certified device applications. Further, by storing the flight plans in the "neutral language" it solves the back translation issue from "synthetic" flight plans to the base definition. In some embodiments, the flight plan is tagged when loaded into the navigator for correlation to the base.

In some embodiments, pre-defined APIs are established for reading and writing data to and from the memory storage device along with appropriate validation filters to assure only verified and correct data received from the non-certified device application(s) is stored in the FAA-certified environment.

Referring to FIG. 15, the gateway includes an interface, bi-directional where appropriate, to FAA-certified NAV/COM/GPS devices and other ship's sensors, such as engine sensors, attitude information, ADC information, OAT, etc. This is used to read data from the sensors, and, where appropriate, write data to these sensors. An example of this is the writing of flight plans to navigators and the tuning of NAV and COM radios. The gateway also includes one or more interface to allow interaction with the Audio Panel. The system supports digitization plus storage and playback of incoming COM transmissions. In some embodiments, the digitization, storage and/or playback is handled on the non-certified device.

The exemplary embodiment and various other embodiments of the present general inventive concept is implemented as a software algorithm, e.g., computer readable codes, on a computer readable medium, such as on firmware of the avionics devices discussed above. Various other embodiments of the present general inventive concept can be embodied as computer readable codes on a computer readable medium and/or computer readable recording medium (collectively "computer readable recording medium" hereafter). The computer readable recording medium may include any data storage device suitable to store data that can be thereafter read by a computer system. Examples of the computer readable recording medium include, but are not limited to, a read-only memory (ROM), a random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Various embodiments of the present general inventive concept may also be embodied in hardware or in a combination of hardware and software Thus, while the present general inventive concept has been shown in the drawings and fully described above with particularity and detail in connection with what is presently deemed to be the most practical and preferred embodiment (s) of the invention, it will be apparent to those of ordinary skill in the art that many modifications thereof may be made without departing from the principles and concepts set forth herein, including, but not limited to, variations in size, materials, shape, form, function and manner of operation, assembly and use.

It is also to be understood that the following claims are intended to cover all of the generic and specific features of the invention herein described, and all statements of the scope of the invention which, as a matter of language, might be said to fall therebetween. Hence, the proper scope of the present general inventive concept should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed is:

1. A method of processing information on-board an aircraft having aircraft equipment, the method comprising:
    utilizing an FAA-certified device to record aircraft data pertaining to the aircraft;
    operably connecting a non-certified device within said aircraft to said FAA-certified device; and
    uploading the aircraft data from the FAA-certified device onto the non-certified device,
    wherein said step of operably connecting said non-certified device to said FAA-certified device comprises:
        generating an encrypted license key for a mobile server in operable data connection with said FAA-certified device;
        hosting said license key on a license server;
        providing authorization credentials of the non-certified device to said license server;
        downloading said license key from said license server to said non-certified device;
        storing said license key within cache on said non-certified device;
        establishing a data connection between said mobile server and said non-certified device;
        providing said license key to said mobile server for validation;
        requesting access by said non-certified device to one or more data resources available via said mobile server in operable data connection with said FAA-certified device; and decrypting and validating said license key by said mobile server before authorizing non-certified device access to said one or more data resources available via said mobile server in operable data connection with said FAA-certified device.

2. The method as claimed in claim 1, further comprising uploading data from the non-certified device to the aircraft equipment.

3. The method as claimed in claim 1, further comprising operably connecting the first device with a mobile server.

4. The method as claimed in claim 3, further comprising operably connecting the non-certified device with the mobile server via the FAA-certified device.

5. A method of displaying information on-board an aircraft comprising the steps of:
   providing an avionics device installed in said aircraft, wherein said avionics device is an FAA-certified device;
   operably connecting a non-certified device within said aircraft to said FAA-certified device;
   transmitting information from said FAA-certified device to said non-certified device;
   generating an encrypted license key for a mobile server in operable data connection with said FAA-certified device;
   hosting said license key on a license server;
   providing authorization credentials of the non-certified device to said license server;
   downloading said license key from said license server to said non-certified device;
   storing said license key within cache on said non-certified device;
   establishing a data connection between said mobile server and said non-certified device;
   providing said license key to said mobile server for validation;
   requesting access by said non-certified device to one or more data resources available via said mobile server in operable data connection with said FAA-certified device; and
   decrypting and validating said license key by said mobile server before authorizing non-certified device access to said one or more data resources available via said mobile server in operable data connection with said FAA-certified device.

6. The method as claimed in claim 5, wherein said transmitting step is performed through a gateway device.

7. A system for transmitting and receiving aircraft data communications, the system comprising:
   an FAA-certified device installed in an aircraft;
   a non-certified mobile computing device configured to send data within said aircraft;
   a display configured to display data targeted to be received by said FAA-certified device from said non-certified mobile computing device; and
      configured to receive user inputs as a confirmation of targeted data, said confirmation requiring user input to accept or reject said targeted data;
      wherein if said targeted data is accepted, then said targeted data is allowed to change information or functionality of said FAA-certified device; and
      wherein if said targeted data is not accepted, then said targeted data is not allowed to change information or functionality of said FAA-certified device;
   an FAA-certified gateway hardware device in said aircraft configured to provide a secure data communication connection with said non-certified mobile computing device;
   said FAA-certified gateway hardware device configured to provide a secure data communication connection with said FAA-certified device;
   said FAA-certified gateway hardware device configured to provide a data filter or a firewall; and
   said FAA-certified gateway hardware device including a gateway services module comprising:
      a software operating system;
      software to provide said secure data communication connection with said FAA-certified device and said secure data communication connection with said non-certified mobile computing device; and
      software to provide targeted data confirmation protocols for determining if said targeted data is allowed to change information or functionality of said FAA-certified device.

8. A method of processing information on-board an aircraft comprising the steps of:
   providing an avionics device installed in said aircraft, wherein said avionics device is an FAA-certified device;
   operably connecting a non-certified device within said aircraft to said FAA-certified device;
   generating FAA-certified information on said FAA-certified device;
   receiving said certified information by said non-certified device;
   utilizing said certified information to generate non-certified information on said non-certified device;
   transmitting said non-certified information from said non-certified device; and
   receiving by said FAA-certified device said non-certified information.

9. The method as claimed in claim 8, further comprising storing information within a data store.

10. The method as claimed in claim 9, wherein said non-certified device receives at least some of said certified information from said data store.

11. The method as claimed in claim 9, wherein said non-certified information includes instructions for manipulating at least some of the data stored in said data store.

12. The method as claimed in claim 11, wherein at least some of the information stored in the data store includes information pertaining to an application configuration associated with the non-certified device.

13. The method as claimed in claim 11, wherein at least some of the information stored in the data store includes information pertaining to a state of the non-certified device.

* * * * *